March 23, 1971     J. H. VOGELMAN ET AL     3,572,316
PHYSIOLOGICAL SIGNAL MONITORING SYSTEM
Filed Feb. 23, 1968                                    4 Sheets-Sheet 4

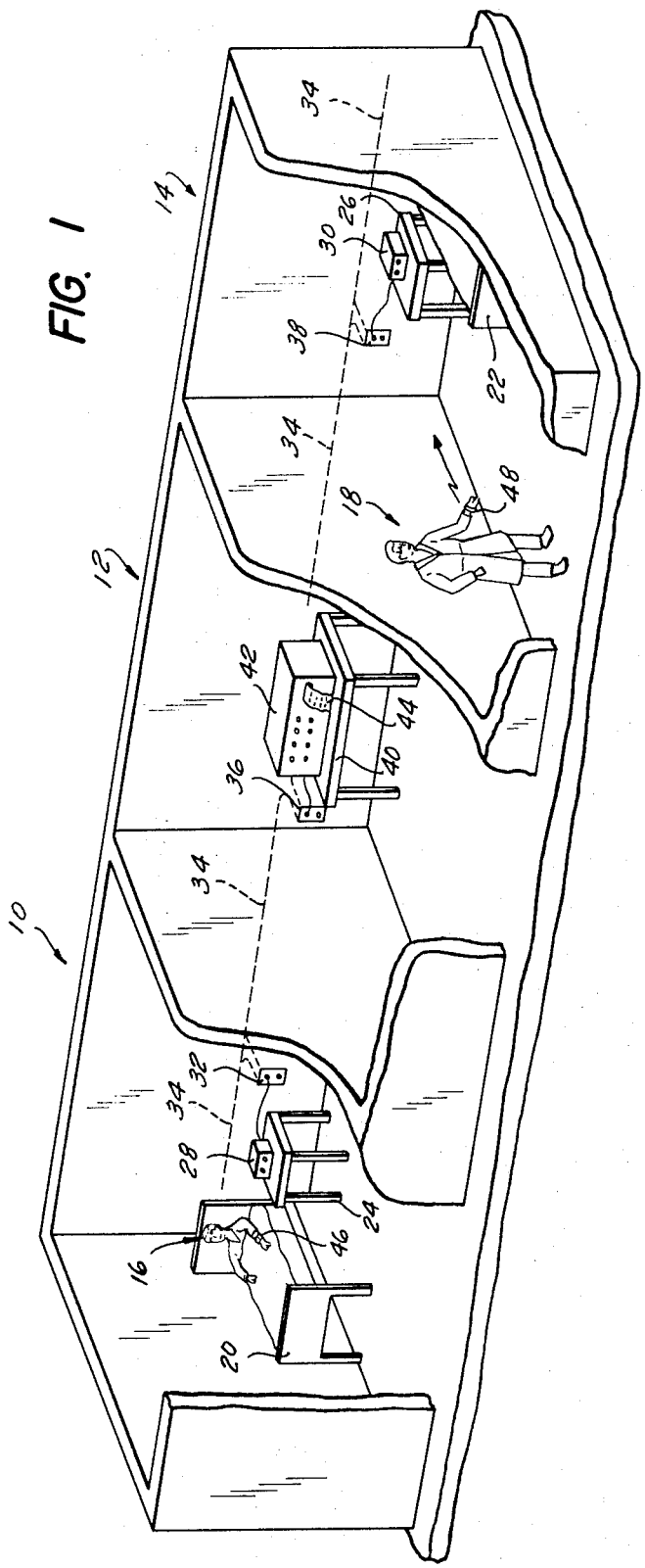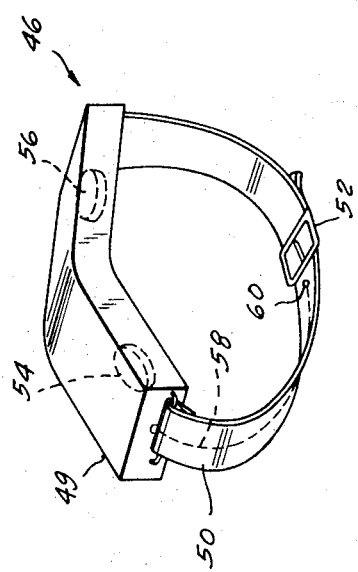

INVENTORS
JOSEPH H. VOGELMAN
ROBERT S. COE
KENNETH B. HOYT
BY BERNARD FEINERMAN

ATTORNEYS

United States Patent Office

3,572,316
Patented Mar. 23, 1971

---

3,572,316
PHYSIOLOGICAL SIGNAL MONITORING SYSTEM
Joseph H. Vogelman, Roslyn, Robert S. Coe, Tuxedo Park, Kenneth B. Hoyt, Peekskill, and Bernard Feinerman, Suffern, N.Y., assignors to Chromalloy American Corporation, West Nyack, N.Y.
Filed Feb. 23, 1968, Ser. No. 707,680
Int. Cl. A61b 5/02
U.S. Cl. 128—2.05                                    14 Claims

ABSTRACT OF THE DISCLOSURE

In one embodiment, the monitoring system is used in a hospital to transmit, to a central monitoring station, signals representing physiological parameters such as pulse rates, temperatures, and respiration rates of a number of patients located in different hospital rooms. The system includes a plurality of small units each worn on the wrist of a patient. Each wrist unit includes transducers for detecting physiological parameters without penetrating the patient's skin, and an F-M wireless transmitter for broadcasting the physiological signals developed by the transducers. The system also includes a plurality of local transceivers each of which receives physiological signals transmitted from one of the wrist units. The transceiver re-transmits the physiological signals over ordinary wiring or signal lines already installed in the hospital for carrying other electrical signals or energy. At the monitoring station, the output signals from the various transceivers are sampled sequentially, and the pulse, temperature and respiration information are displayed and printed for review by medical personnel.

---

This invention relates to apparatus for monitoring the physiological parameters of living beings; more particularly, the present invention relates to a system for the remote monitoring of the physiological parameters of a number of different patients located in different rooms or parts of a hospital.

There are a number of prior art systems available for the remote monitoring of the physiological parameters of human beings. One such system is that used for monitoring and recording the temperature, blood pressure, pulse rate, etc. of astronauts who are circling the Earth in space capsules. In such systems, probes are inserted into the bodies of the astronaut, and radio-telemetry equipment is used to transmit signals corresponding to the physiological parameters to ground stations where they are observed and recorded.

In a prior system which has been used in hospitals for monitoring the physiological parameters of very ill patients in intensive care wards, probes also are inserted into the body. The signals produced by the probes are transmitted through cables specially installed in the hospital to a central station where an individual display unit is provided for each patient. Occasionally, an additional display unit is provided at the patient's bedside so that a nurse or doctor can observe the physiological parameters at that location too. Such an arrangement makes it convenient for a single doctor or nurse to carefully watch the physiological parameters of a number of very ill patients at the same time without being present at the bedside of any of the patients.

There is a need for equipment to monitor the physiological function of patients less than seriously ill, especially those in hospitals. Shortages of medical personnel in hospitals has made it necessary to limit the frequency of examination of the pulse rate and other physiological parameters of such patients to levels far below those recommended by most doctors. A system by means of which one nurse or doctor could monitor numerous patients could make it practical to examine the important physiological parameters of each patient far more frequently than presently is practical.

None of the known prior systems is entirely suitable for use in monitoring the physiological parameters of patients in a hospital or at home who are not very ill. The insertion of probes into the body usually is quite objectionable to all but the patients who are very ill. Furthermore, most patients who are less than seriously ill will wish to move around and not lie in bed continuously. Therefore, in the prior systems in which the wires are connected to the probes and hang from the bodies of the patients, the wires would impede the movements of the patient and would be highly unsatisfactory and uncomfortable. Furthermore, because of the expensive cables and measurement equipment they require, such prior systems are very expensive and impractical for widespread use. Although some wireless and probeless measurement systems have been proposed in the past, they have not found general acceptance and are believed to be generally impractical for hospital or home use.

In view of the foregoing, it is an object of the present invention to provide a physiological parameter monitoring system suitable for use with comfort by patients less than seriously ill; a system in which probes need not be used to conduct signals from the body to the monitoring equipment. Furthermore, it is an object of the present invention to provide a monitoring system which is relatively inexpensive and is practical for use in monitoring the parameters of many different patients in different rooms in a hospital, or for many different patients recuperating at their homes.

The foregoing objects are met, in accordance with the present invention, by the system described in the following description and drawings.

In the drawings:

FIG. 1 is a perspective, partially schematic view illustrating the use of the invention to monitor the physiological parameters of different patients in different rooms in a hospital;

FIG. 2 is a perspective view of a wrist-mounted transducer and radio transmitter unit forming a part of the system of the present invention;

THE OVERALL SYSTEM

Figure 3:
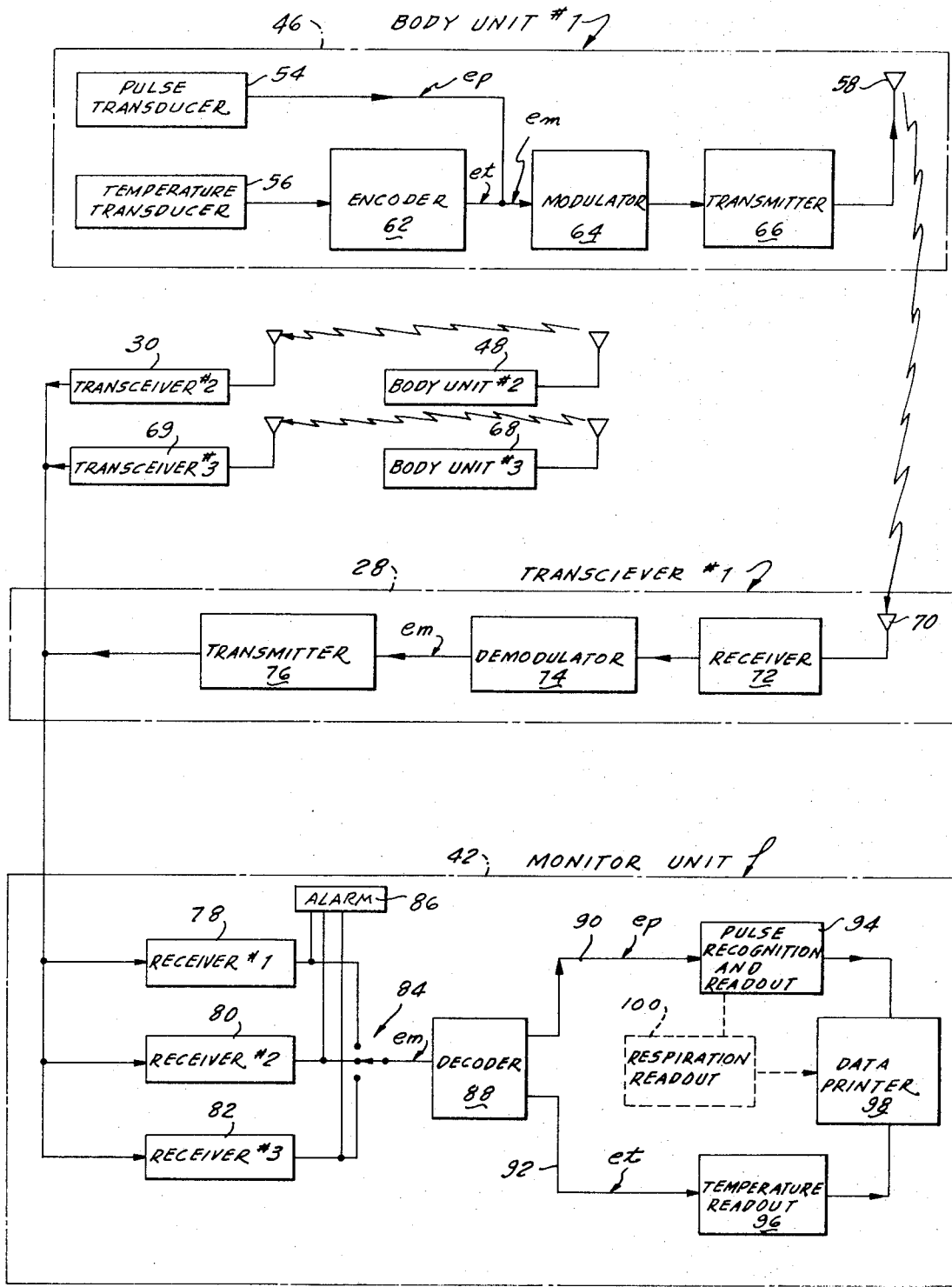
FIG. 3 is a schematic circuit diagram of the system illustrated in FIG. 1.

FIG. 1 of the drawings shows three rooms 10, 12 and 14 in a hospital. A patient 16 is in a bed 20 in one room 10, and another patient 18 is out of his bed 22 and is standing in a second room 14. The third room 12 is a monitoring station in which a single doctor or nurse can watch the monitoring equipment in the room and monitor the physiological parameters of the patients 16 and 18 without going to the rooms of those patients. Of course, it is to be understood that normally many more patients and many more rooms would be included in such a system, but the number of patients and rooms has been limited to two for the sake of brevity and clarity in the drawings and description.

Positioned on a table 24 near the bed 20 in a room 10 is a transceiver 28. A similar table 26 and a transceiver 30 are located in the second room 14. The transceiver 28 has an electrical cord with a plug which is plugged into the 60 cycle household current receptacle 32 in the room, and the transceiver 30 similarly is plugged into the household current outlet 38 in the second room 14. The cords plugged into the receptacles 32 and 38 are connected to a household current line 34 which is located inside the walls of the hospital. In the monitor room 12, a monitor unit 42 rests on a table 40, and is connected by means of a cord plugged into a receptacle 36 to the same household current line 34 as the one to which the transceivers 28 and 30 are connected. The patient 16 in the first room 10 wears a wrist or "body" unit 46, and the patient 18 in the second room 14 wears a similar wrist unit 48.

As is shown in FIG. 2, which illustrates the wrist unit 46 but is to be understood to also illustrate the unit 48, each wrist unit includes a housing 49, and a strap 50 with a buckle 52. Two transducers 54 and 56 are mounted in the housing, and an antenna 58 passes out of the housing 49 and through the interior of one portion of the strap 50 and terminates at a conductive member 60 on the strap.

The wrist unit 46 is strapped onto the wrist with the transducers 54 and 56 in contact with the surface of the wrist which is on the same side as the palm of the hand. The conductive member contacts the opposite side of the wrist. Of course, the unit need not be strapped onto the wrist, but can be attached at any convenient location on the body. Radio transmitter apparatus (not shown in FIG. 2) broadcasts radio signals containing pulse and temperature information produced by the transducers 54 and 56 and transmits that information without the use of wires to the local transceiver 28 or 30. The local transceiver amplifies and re-transmits the signals over the cord plugged into the wall outlets and through the house current line 34 to the monitor unit 42.

The monitor unit 42 periodically samples the pulse rate and temperature of each patient, displays this information, and records the information on a paper strip 44, together with identification of the patient, date, time and other pertinent data.

The system described above has numerous advantages. One advantage is that the transducers, which will be described in greater detail hereinbelow, need not be inserted into the body to function properly, Furthermore, because the wrist unit 46 or 48 is very small and lightweight, and because it does not have any cumbersome wires attached to it, the unit is not uncomfortable to wear and the patient will not be greatly tempted to remove it. Also, the patient can move around in his room comfortably without interrupting the operation of the monitoring system. Additionally, the system uses transmission lines to transmit the information to the monitor station instead of merely transmitting the information by wireless broadcast, thus preventing the signals from becoming attenuated by the walls between the monitoring station and the hospital rooms and thereby maintaining the small size of the wrist unit.

Important cost savings are obtained by using ordinary house current lines as the signal transmission lines. Similar savings can be obtained by using other conductors already installed in the hospital walls instead of the house current lines. Examples of such other conductors include lines used to conduct bell signals to the nurses' stations, television program distribution cables, and intercommunication and telephone system wires. By thus using conductors already present in the building, the cost of installing additional cables is avoided; nonetheless, the present invention makes it possible to use the conductors for their original purpose without interference from the physiological signals. In short, the system provides a relatively low-cost means for improving the care of patients in a hospital or at home.

The construction of the components of the preferred embodiment of the invention will be described next.

THE WRIST UNIT

FIG. 3 shows schematically the components of the wrist or "body" unit 46. The signals produced by the pulse and temperature transducers 54 and 56 are used to modulate the signals produced by an FM transmitter 66 which are broadcasted by means of the antenna 58. The pulse transducer 54 can be any one of a number of small commercially available transducers which will produce electrical signals corresponding to the pulse signals created by the beating of the heart of a human being. A transducer which has been found to meet these specifications is sold by Gulton Industries, Inc. and is designated the "P–500 Peripheral Pulse Sensor." It is believed that this device includes a piezoelectric crystal which produces a voltage signal proportional to the acceleration it receives due to the changing blood pressures sensed in the veins or arteries of the body. When it is pressed against a pulsating vein in the wrist, it produces voltage signals $e_p$ such as those shown in FIG. 6.

Figure 6:
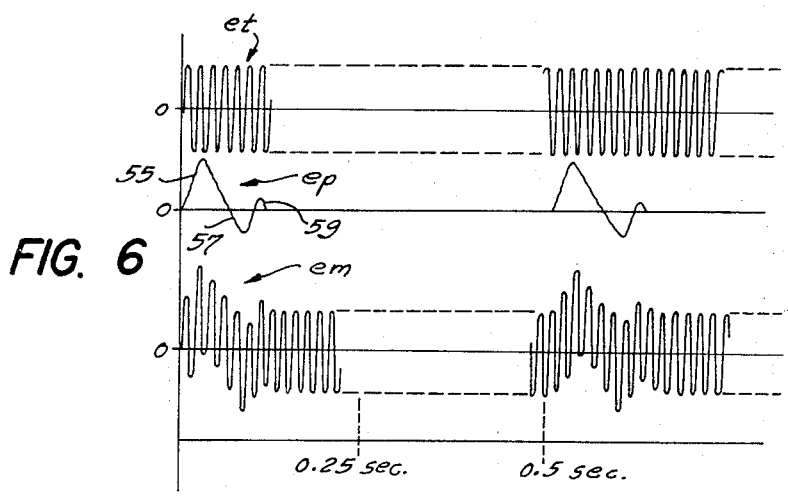
FIGS. 6, 7 and 8 are graphs showing the voltage wave forms in various parts of the system shown in the preceding figures of these drawings.

As is shown in FIG. 6, each heart pulse in the typical human being creates a signal which has a fairly steep leading edge 55 and a fairly steep trailing edge 57 which has a negative peak, and has a small trailing positive peak 59. The shape of this pulse signal is nearly the same for most human beings. The pulse time duration and repetition rate similarly vary over a relatively predictable range as between different human beings.

The temperature transducer 56 preferably comprises a thermistor which, as is well known, has a resistance which changes with its temperature. When it is pressed against the wrist of the patient, its temperature is the temperature of the patient. The thermistor forms a part of an encoder circuit 62 which preferably comprises a conventional "bridge T" or "twin T" R–C oscillator in which the thermistor is the resistive element. As is shown in FIG. 6, the output $e_t$ of the encoder 62 is a sine wave whose frequency depends upon the temperature sensed by the thermistor. The pulse and temperature signals are added together to form a combined wave $e_m$ (FIG. 6) which is conducted to a modulator 64 which modulates the transmitter output accordingly.

Preferably, the frequency of the signal $e_t$ is made 10 times the temperature sensed, in degrees Fahrenheit. For example, if the temperature sensed were 98.6° Fahrenheit, the frequency of the encoder output would be 986 cycles per second. Of course, other multiples of the temperature could be used too. However, since the temperature and pulse signals are to be combined for modulating the transmitter output, and since the pulse signals may have important components with frequencies up to 10 cycles per second, it is preferred that the frequency of the encoder be substantially greater than 100 cycles per second so that the signals can be separated from one another easily at the monitor unit.

The transmitter 66 can be any of a number of small commercially available FM transmitters, but preferably is a crystal-controlled oscillator the frequency of whose signals is multiplied five times by a conventional multiplier circuit to produce output signals within the preferred frequency range of 88 to 108 megacycles; that is, within the standard FM broadcast band. The modulator 64 also may be of any small type commercially available, but preferably is a varactor diode circuit, which is well known in the art and which is commonly used for this purpose.

In order that a number of patients may simultaneously transmit physiological signals to their local transceivers without interferring with one another, the center frequency of the transmission band for each transmitter preferably is made different from the center frequency of other transmitters. For example, a separation of 200 kilocycles between adjacent transmission channels is preferred in order to prevent interference. The range of the transmitter need not be very great, and a range of around 15 feet should be sufficient for most purposes in a hospital system.

In FIG. 3, additional body or wrist units 48 and 58 are shown schematically for the purpose of illustration. Each unit is identical to the unit 46 except that it produces signals over a frequency band different from that of the unit 46.

THE TRANSCEIVER UNIT

Each transceiver unit such as the unit 28 shown in FIG. 3 includes a receiving antenna 70, a receiver 72 and a demodulator 74. Also included is a transmitter 76 which re-transmits the signals over the power lines 34 to the monitor unit 42. Since the standard FM broadcast band is used for transmission from the wrist unit, a conventional high-fidelity FM tuner can be used. It includes the antenna 70, the receiver 72 and the demodulator 74. The signal produced by the demodulator 74 of the tuner is the same as the signal $e_m$ sent to the modulator 64 in the wrist unit, and is shown in FIG. 6. The transmitter 76 can be any type of conventional FM transmitter, for example, a standard L-C oscillator using a varactor diode for modulation. The output frequency of the transmitter 76 should be substantially lower than the 88 to 108 megacycle broadcast frequency unless the conductor over which the signals are to be transmitted is shielded. If the conductor is not shielded, the output frequency of the transmitter should be in the range from approximately 20 to 460 kilocycles. At these frequencies there will not be any significant radiation loss of the signal from unshielded transmission lines, and there will not be a significant amount of cross-talk between the various lines. The lower limit of the frequency range should be considerably above the frequency range of the signals normally transmitted over the lines. For example, if the transmission lines are intercommunication system lines which normally conduct audio-frequency signals, then the transmission frequency should be greater than about 20 kc. If, on the other hand, the transmission lines are house current lines carrying 60 cycle current, interference between the FM signals and the energy flowing through the lines will be avoided even at a somewhat lower minimum frequency because of the vast differences between the frequencies of the two signals.

It should be recognized that each transceiver unit provides significant amplification of the signal it receives. Therefore, the transmission lines can be telephone lines leading from the home of the patient to a hospital or a doctor's office in which the monitoring unit is located. Such a system would provide a very convenient way to check the recuperation of heart patients and the like without having a prolong their stay in the hospital.

Transceivers 30 and 69 are shown in FIG. 3, in addition to the transceiver 28. The construction of each of the other transceivers 30 and 69 is substantially identical to the construction of transceiver 28, except that each transceiver transmits over a different frequency band so that the signals will identify the patient from which they are transmitted. For example, in a system for serving the patients and having ten separate transmission channels, the center frequency of transmission for each varies from 100 k.c. to 460 k.c., with 40 k.c. separation between adjacent channels.

Each transceiver preferably has an external warning light on it which lights when the receiver is properly tuned and when it is receiving temperature signals from a wrist unit. Means are provided in the rear of the transceiver for tuning the receiver. The warning light serves the additional function of informing medical personnel that, when it is not lighted, either the patient is not wearing his wrist unit, or that something drastic has happened to alter or eliminate the temperature signal.

THE MONITOR UNIT

In the monitor unit 42 shown in FIG. 3, each of a plurality of receivers 78, 80 and 82 is connected to the transmission line 34 and is tuned to receive the signal transmitted from one of the transceiver units. The reference numeral 86 identifies a unit which is connected to the output leads of the receivers and may consist of one or more alarm devices or oscilloscopes. The alarm device would be actuated when there are sudden changes in any of the signals being received so that a doctor or nurse will be warned that either a patient has had a relapse or that there is some other disruption in the transmission of the signals. The oscilloscope can be used to continuously observe the waveforms of the signals received.

A selector switch 84 is provided to sequentially connect the outputs of the receivers 78, 80 and 82 to a decoder unit 88 which comprises two sets of band-pass filters, one filter having a center frequency of around 1,000 cycles per second and conducting temperature signals $e_t$ over a lead 92 to a temperature readout unit 96, and thence to a data printer 98. The decoder unit 88 also includes a low-pass filter which passes signals of a frequency lower than 100 c.p.s., and thus conducts the human pulse signals through an output lead 90 to a pulse recognition and readout unit 94 and to the data printer 98. Thus, the decoder separates the pulse and temperature signals from one another and sends them by way of separate paths to the printer 98. A respiration readout unit 100, shown in dashed outline in FIG. 3, optionally may be provided to indicate the rate and depth of respiration of the patient.

PULSE RECOGNITION AND READOUT CIRCUIT

The pulse recognition and readout circuit serves the purpose of transmitting only true human pulse signals to the printer and rejecting noise and other signals which are not desired to be printed. In many types of transducers available for use as pulse transducers, movements of the hand of the patient can cause the transducer to produce spurious signals. Also, although using the FM mode of transmission eliminates much external interference, some interference inevitably will become introduced into the system, and it should be eliminated.

Figure 4:
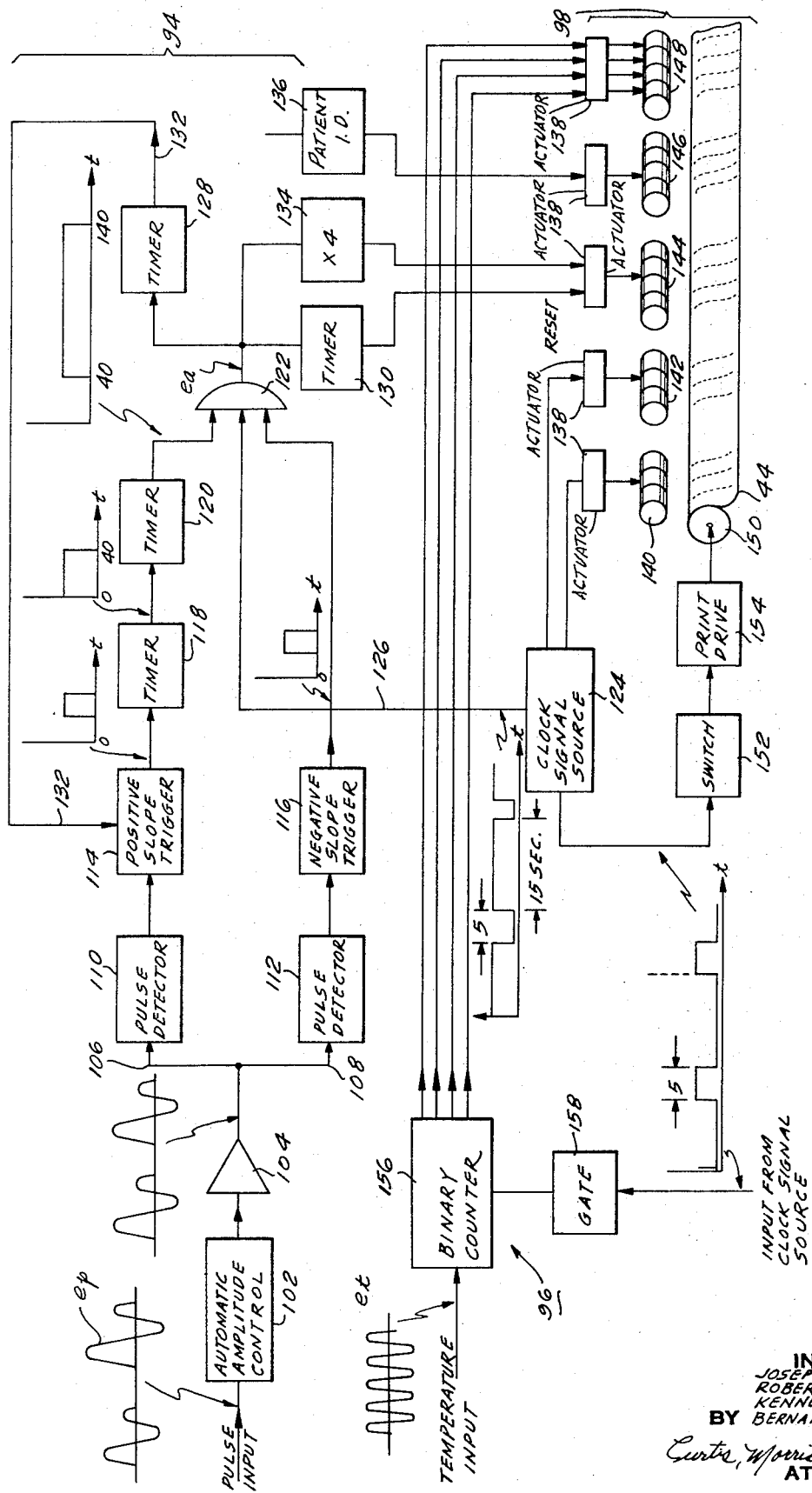
FIG. 4 is a more detailed schematic circuit diagram of a portion of the system shown in FIG. 3.

Referring now to FIG. 4, the pulse input signal $e_p$ may vary considerably in amplitude. Since it is desired to use signals of uniform amplitude, a conventional automatic amplitude control circuit 102, sometimes known as an automatic volume control or "AVC" circuit, is used to produce signals of uniform amplitude. A band-pass amplifier 104 next is used to amplify the signals and to pass only those within the frequency range of from about 2 to 100 c.p.s., the range including the spectral frequency components of the usual human pulse signals.

The amplifier pulse signals then are sent over a lead 106 to a pulse detector 110 circuit and a positive slope trigger circuit 114, and over another lead 108 to another pulse detector 112 and a negative slope circuit 116. The pulse detector circuits 110 and 112 are identical, except that one detector circuit 110 produces an output signal when a voltage waveform of positive slope is received, whereas the pulse detector 112 produces an output signal only when a voltage waveform of negative slope is received. Each pulse detector includes a transistor with an inductor connected to the emitter lead to detect a time-rate-of-change in the input current and produce an output current in response thereto. Each trigger circuit 114 and 116 preferably is of the type known as a "Schmitt trigger" which produces an output signal when its input signal reaches a certain predetermined level. The waveforms of voltages produced at various points in the circuit shown in FIG. 4 are illustrated in the drawing.

The output signals from the triggers 114 and 116 are conducted to an "AND" circuit 122 together with a clock signal (whose waveform is indicated in the drawing) which is sent from a conventional clock signal source 124 over a line 126. The "AND" circuit 122 is a conventional coincidence detector which will produce an output signal only when input signals are received simultaneously on each of its three input leads.

The signals from the positive slope trigger circuit 114 pass through two timing circuits 118 and 120. Both timing circuits 118 and 120 preferably comprise monostable multivibrators. The first timer 118 produces an output signal immediately upon receiving an input signal, and produces a DC output signal for a predetermined length of time. The second timer 120 is triggered only by the negative-going portion of the output signal from the first timer 118. The timer 120 remains turned on for a predetermined length of time, and then turns off again. Thus, a signal is supplied from the positive slope trigger to the "AND" circuit 122 only for a predetermined length of time determined by the timer 120. The reason for this is that if a negative-going spurious pulse is received by the circuit when a negative-going pulse would not normally occur in a human heart pulse, the spurious signal will not be allowed to pass onto the "AND" circuit 122. The time duration of the output of timer 118 can be set so as to include the usual duration of the positive slope portion of a human pulse signal. It is believed that a time of about 40 milliseconds will suffice for this purpose. The period for which the timer 120 produces an output signal is the normal time in which a negative-going pulse would be expected to be received if the pulse is a normal human pulse. It is believed that a period of about 100 milliseconds is sufficient for this purpose. Thus, a spurious signal in which a negative-going portion does not occur at the proper time is not allowed to pass.

The output pulses $e_a$ from the "AND" circuit 122 are conducted to a multiplier circuit 134 and thence to a counter actuating mechanism 138. The multiplier circuit 134 multiplies the number of pulses it receives by four. Its use is optional and will be described in greater detail below. The counter drive circuit 138 derives the number wheels of a mechanical "Veeder-Root" type counter which is indicated schematically at 144. The timing signals produced by the clock signal source 124 on line 126 and input to the "AND" circuit 122 comprise pulses fifteen seconds in length separated by five-second periods of zero voltage. Thus, a train of pulses is counted by the counter 144 for fifteen seconds. Since the number of pulses is multiplied by four by the circuit 134, at the end of the fifteen second period the counter 144 indicates the average pulse rate of the individual, in pulses per minute. At the end of each fifteen second interval, the clock signal source 124 sends a five-second pulse to a switch 152 and then to a print drive unit 154 which causes the numbers displayed on the counter 142 to be printed onto the paper strip 44 by bringing the roller 150 into contact with the number wheels of the counter. Simultaneously, other items of information are printed from the print wheels of other mechanical counters 140, 142, 146 and 148. Specifically, the counter 140 displays and prints the date, counter 142 displays and prints the time of day, and counter 148 displays and prints the temperature information for the patient. Counter 146 displays and prints a patient identification number which is transmitted to it by a patient identification signal circuit 136 from the transceivers, this circuit forming no part of the present invention. Many different types of printers can be used for this purpose, but it is preferred that a "printing counter" or "printing impulse counter" such as that sold under the trademark "Sodaco" be used because it produces both visual presentation and print-out of the date, and is generally relatively inexpensive. During each 15 second interval when pulses are being counted, the print drive mechanism is de-energized.

The timers 128 and 130 are connected to the output of the "AND" circuit 122. Timer 128 preferably comprises a monostable multivibrator whose "on" period corresponds to the minimum time between successive normal heart pulses, which is approximately 500 milliseconds. The output of the timer 128 is conducted over a line 132 to the positive slope trigger 114 in a manner such as to disable that trigger. Thus, if any signal is received during the 500 millisecond "on" period of the timer 128, no output signal will be produced by the "AND" circuit 122 because the circuit 114 will be disabled, and the signal will be blocked. This provides a further impediment to the passage of spurious signals through the system.

The output of the timer 130 is conducted to the counter drive circuit 138 for counter 144 so that if the next heart pulse is not received within about 1.5 seconds, the timer voltage reaches a level at which a level detector circuit in the counter drive 138 causes the counter 144 to be reset to zero, thus indicating a pulse was missed and starting the counting cycle over again. The 1.5 second time period is the maximum time period expected between adjacent heart pulses. The timer 130 can itself be reset. Thus, if another heart pulse signal is received before the end of 1.5 seconds, then that pulse signal resets the timer 130 and starts its timing cycle once again.

TEMPERATURE READOUT CIRCUIT

The temperature readout circuit 96 includes a binary counter circuit 156, to which the temperature signal $e_t$ is input, and a gate circuit 158. When the gate circuit 158 receives a five-second pulse from the clock source 124, it produces a one-second pulse which is sent to the counter 156 and turns it on for one second. The number of cycles counted in the one second period is presented on the output leads of the counter 156 and is sent to the counter drive circuit 138 for the temperature counter 148. It is preferred that the counter 156 be of a type which produces output signals in parallel form, and the drive circuit 138 for counter 148 is adapted to utilize these signals to drive the mechanical counter 148. As mentioned above, the frequency of the temperature signal $e_t$ is directly proportional to the temperature sensed, in degrees Fahrenheit. For example, the signal $e_t$ has a frequency of 986 c.p.s. for a measured temperature of 98.6°. Thus, the number of counts counted in the one second the counter 156 is operating will be directly representative of the temperature and the counter 148 will read 98.6. Suitable reset means can be provided for the counter 156 and all of the mechanical counters, as is well known in the art.

RESPIRATION READOUT CIRCUIT

Figure 5:
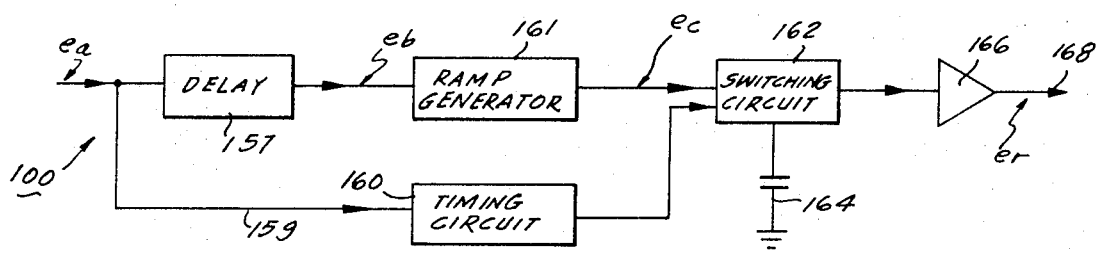
FIG. 5 is a schematic circuit diagram of another portion of the circuit shown in FIG. 3.
Figure 8:
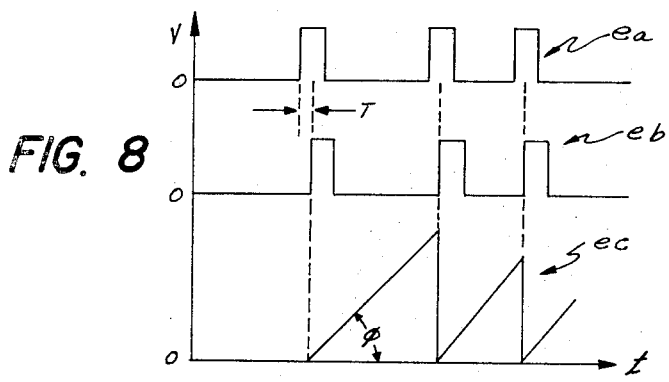

The respiration readout circuit 100 is shown in FIG. 5, and the voltages produced at various points in the circuit are shown in FIG. 8. The input signals $e_a$ preferably are in the form of rectangular pulses such as are produced at the output of the "AND" circuit 122 in FIG. 4.

It is known that the instantaneous repetition rate of the pulses $e_a$ varies with the breathing of the patient. It also is known that the pulse repetition rate and, hence, the spacing between adjacent pulses, varies in an approximately sinusoidal fashion. These facts are used, in accordance with the present invention, to provide means for measuring the respiration rate R and the depth D of respiration of the patient. Each pulse received at the input of the circuit 100 is delayed, by means of a delay circuit 157, by a certain small amount of time T (see FIG. 8). Simultaneously, the pulse travels through a lead 159 and a timing circuit 160 to a switching circuit 162. Switching circuit 162 connects a capacitor 164 first to the output terminal of a ramp generator 161, until the capacitor is charged to the output voltage of the ramp generator, and then to the input of a high-impedance DC amplifier 166. The time during which the capacitor 164 is connected to the ramp generator 161 is less than the delay time T.

Figure 7:
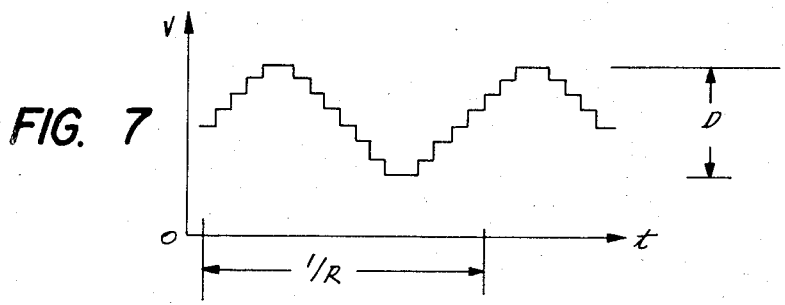

The ramp generator 161 preferably is a conventional sawtooth wave generator whose output is reset to zero by the receipt of each new pulse. The output wave of the generator 161 is shown in FIG. 8. The rising portion of each wave has the same angle of inclination $\phi$. The magnitude of the voltage sensed by the capacitor 164 is directly proportional to the spacing between adjacent incoming pulses, and thus is directly proportional to the instantaneous repetition rate of the heart pulse wave. Because of the high input impedance of the amplifier 166, the capacitor 164 does not discharge significantly while it is connected thereto. Therefore, the amplifier 166 produces a signal $e_r$ upon the output lead 168 which has a waveform such as that shown in FIG. 7. This wave has a generally sinusoidal shape, and is composed of incremental steps formed by the switching arrangement described above. The frequency of the wave shown in FIG. 7 is approximately representative of the respiration rate R of the patient, and the peak-to-peak amplitude of the wave is approximately indicative of the depth of the breathing of the patient. The output signal $e_r$ can be recorded on a chart recorder, or can be converted into a form suitable for printing on the sheet 44 by a printing counter.

It should be emphasized that the use of the respiration readout circuit 100 is optional since in many instances it will be entirely satisfactory to monitor only the temperature and pulse rate information from the patients.

The sampling of information from various different patients can be performed in many different sequences. However, one particular advantageous schedule which is used in the preferred embodiment of the present invention is to take samples from one patient for two minutes total time, and then move onto the next patient, repeating the entire survey of all the patients once every hour. As is evident from an examination of the timing wave shown in FIG. 4, during a particular two minute period the patient would have six consecutive samples of his physiological parameters taken. Thus, if there are any erroneous samples, they could be discarded in comparison with the other samples. The switching of the selector switch 84 shown in FIG. 3 to accomplish this timing cycle can be performed by well known electromechanical timing devices and drive motor means which are well known in the art.

It should be readily apparent that separate receivers 78, 80 and 82, etc., need not be provided for each transceiver, and that a single receiver with adjustable tuning controlled by the selector mechanism 84 can be provided instead. This will provide a considerable saving in the cost of the monitoring equipment.

The above description of the invention is intended to be illustrative and not limiting. Various changes or modifications in the embodiments described may occur to those skilled in the art and these can be made without departing from the spirit or scope of the invention as set forth in the claims.

W claim:

1. Apparatus for monitoring physiological parameters in which said parameters are electrically transmitted from a body which is the source of said parameters to a remote station along a path including a transmission line, said apparatus comprising, in combination, transducer means for detecting said physiological parameters and converting said parameters into electrical signals suitable for wireless transmission, including, a pair of transducer devices, one of said devices being a thermosensitive resistor producing an oscillating voltage signal in response to the physiological signal sensed thereby, and the other of said devices being a piezoelectric pulse transducer, said transducer means further including an encoder oscillator operatively connected to said resistor for producing an oscillatory voltage whose frequency varies with the resistance of said resistor and which is substantially different from the oscillatory voltage signal produced by said one transducer device; first transmitter means including a modulator, means for conducting said oscillatory voltages together to said modulator and means for wireless transmission of the combined oscillatory voltages as an electrical signal; local receiver means for receiving the signals transmitted by said first transmitter means, second transmitter means for transmitting to said remote station, over said transmission line, the signals received by said local receiver means, and remote receiver means coupled to said transmission line at said remote station for receiving the signals transmitted by said second transmitter means, and including a plurality of separate signal utilization paths, and frequency response means for separating said combined oscillatory voltages and conducting each of them along a separate one of said utilization paths.

2. Apparatus as in claim 1 in which said transmission line is installed in a building and carries, in addition to signals from said second transmitter, alternating current signals from a source other than said second transmitter, the frequency range of the signals from said second transmitter being substantially different from the frequency range of the signals from said other source.

3. Apparatus as in claim 1 in which said frequency responsive means at said remote station comprises band pass filters.

4. Apparatus as in claim 3 including a mechanical printing-display unit operatively connected to said utilization paths for displaying and printing-out physiological parameters.

5. Apparatus as in claim 1 wherein said electrical signal produced by said means for wireless transmission being a very high frequency electrical signal, said transmission line being unshielded and said signal transmitted by said second transmitter means being at a frequency relatively much lower than the frequency of said very high frequency electrical signal.

6. Apparatus for monitoring through a path including transmision lines, as a monitoring station in a hospital, the physiological parameters of a plurality of patients located in a plurality of different rooms from said station, said apparatus comprising, in combination, a plurality of transducers adapted to be placed on each of said patients, in a position to detect said parameters for producing electrical signals representative of said parameters and including at least two transducer devices, one for detecting heart pulses and another for detecting temperature, and an encoder means for converting signals from the temperature transducer device into frequency variable electrical signals of a frequency substantially higher than the highest frequency components of said signals from the heart pulse transducer device; a plurality of radio transmitter means adapted to be placed on each one of said patients and being connected to at least one of said transducers, said transmitter being of frequency modulated variety including a modulator, means for conducting and combining the pulse and temperature signals together to said modulator, and means for transmitting the combined signals from said patient in a selected frequency band, a plurality of local transceivers adapted to be located in each of said rooms, each transceiver including a receiver for receiving said signals in said selected frequency band, a transmitter operatively connected to said receiver and to said transmission lines, for retransmitting said combined signals over said transmission line, a second receiver operatively connected to said transmission lines at said monitoring station, for receiving said combined signals from said transmission line.

7. Apparatus as in claim 6 in which said transmission line comprises communication conductors for carrying oscillatory communications signals of a frequency substantially different from those of the physiological signals transmitted thereover, the transmision frequency bands for the transceivers being different so as to identify the transceiver from which the signals emanate.

8. Apparatus as in claim 7 including, band-pass filter means at said monitoring station for separating said pulse and temperature signals, and means for separately displaying said signals.

9. Apparatus as in claim 8 in which said transmission line is unshielded, said radio transmitters transmit over a very-high-frequency band, and said transceivers transmit over a relatively low frequency band.

10. Apparatus as in claim 8 including means, operatively connected to said band pass filter means, for receiving said pulse signal and converting said pulse signals to an output signal whose frequency and magnitude is proportional to the repetition rate of said pulse signals and is indicative of the respiration of the patient.

11. Apparatus as in claim 10 wherein said means for converting said pulse rate signal includes, a ramp signal generator for generating signals whose voltage increases from zero with time in accordance with the instantaneous repetition of said human pulse signals, said generator having means for restoring said voltage to zero by the reception of each successive heart pulse signal, and means for sampling the voltage of said generator just prior to each such restoration to zero and producing an output signal changing with the voltage sampled.

12. Apparatus as in claim 11 including delay means for delaying the receipt of each heart pulse signal to said ramp generator, and wherein said sampling means includes, a capacitor, a high input-impedance DC amplifier, switching means responsive to each of said heart pulse signals for connecting said capacitor first to the output of said ramp generator for a time less than said delay time but great enough to charge said capacitor to the voltage of said ramp generator, and then to the input of said amplifier, the output of said amplifier providing the output signal representative of respiration of the patient.

13. In a system for monitoring physiological parameters, comprising transducer means for generating and transmitting oscillating electrical signals representative of heart pulsations, a patient monitoring station, and circuit means for receiving said signals and for discriminating true heart pulse signals and spurious signals and passing an output signal to said monitoring station, said circuit means including, first and second signal utilization paths, means in said first path for producing a first output signal when the slope of said electrical signal is positive, means in said second path for producing a second output signal when the slope of said electrical signal is negative, means in said first path for receiving said first output signal and producing a delayed output signal of predetermined duration, and AND gate circuit means, having at least two inputs leads, for producing said circuit output signal to said monitoring means when an input signal is received in each of its inputs leads, said AND gate circuit including a first input lead for receiving said second output signal from said second utilization path and a second input lead for receiving said delayed output signal from said first path, whereby, said circuit output signal is produced by said AND gate only when an electrical signal having a negative slope is received from said transducer during said predetermined duration of said delayed output signal.

14. Apparatus as in claim 13 including means actuated by said circuit output signal for disabling said first output signal producing means for a predetermined time after production of said circuit output signal by said AND gate, whereby a signal received from said transducer during said predetermined time will be blocked and will not produce an output signal from said AND gate.

References Cited

UNITED STATES PATENTS

| | | | |
|---|---|---|---|
| 2,492,617 | 12/1949 | Boland et al. | 128—2.06 |
| 3,171,892 | 3/1965 | Pantle | 128—2.05X |
| 3,212,496 | 10/1965 | Preston | 128—2.06 |

FOREIGN PATENTS

| | | | |
|---|---|---|---|
| 718,131 | 11/1954 | Great Britain | 128—2.15 |

OTHER REFERENCES

Geddes et al.: "American Journal of Medical Electronics," January-March, 1962, pp. 62–69.

WILLIAM E. KAMM, Primary Examiner